United States Patent [19]

Gutierrez

[11] Patent Number: 4,781,071

[45] Date of Patent: Nov. 1, 1988

[54] DEVICE FOR RECIPROCATING MOVEMENT

[76] Inventor: Arturo M. Gutierrez, Paseo del Pintor Rosales, 38, 28008 Madrid, Spain

[21] Appl. No.: 945,481

[22] Filed: Dec. 23, 1986

[30] Foreign Application Priority Data

Dec. 28, 1985 [ES] Spain ...................................... 291362

[51] Int. Cl.⁴ ............................................. F16H 21/36
[52] U.S. Cl. ...................................... 74/50; 74/568 T
[58] Field of Search .................... 74/50, 421 A, 568 T, 74/421 R

[56] References Cited

U.S. PATENT DOCUMENTS

| 2,285,702 | 6/1942 | Forss | 74/50 |
| 3,246,528 | 4/1966 | Kosch | 74/50 |
| 3,566,703 | 3/1971 | Van Noord | 74/50 |
| 4,165,658 | 8/1979 | Ueno et al. | 74/421 R |

FOREIGN PATENT DOCUMENTS

| 520490 | 3/1931 | Fed. Rep. of Germany | 74/50 |
| 58-163856 | 9/1983 | Japan | 74/50 |
| 569938 | 8/1977 | U.S.S.R. | 74/50 |

*Primary Examiner*—Lawrence J. Staab
*Attorney, Agent, or Firm*—Laurence R. Brown; Alfred J. Mangels

[57] ABSTRACT

A device for reciprocating movement, wherein a pair of drivingly connected gearwheels each has an outwardly extending stud that engages one of a pair of spaced, aligned slots in a transverse member. The transverse member is guided for movement by a pair of laterally spaced jambs that include opposed, respective longitudinally extending slots that receive the outer end portions of the transverse member. One of the gearwheels includes an axially extending concentric track that is circular and includes at least one gap or opening, and an electrical switch in contact with the track for regulating the operation of an electrical circuit that controls the rotation of the gearwheels. One of the gearwheels drives an associated gear at a predetermined gear ratio, the associated gear including a pair of spaced, concentric, axially outwardly extending circular tracks, each of which is contacted by a switch that also is connected in series with the electrical switch associated with the one gearwheel, in order to control the application of rotary power to the device.

4 Claims, 1 Drawing Sheet

4,781,071

DEVICE FOR RECIPROCATING MOVEMENT

BACKGROUND OF THE INVENTION

The present invention relates to a device of alternated movement to obtain short displacements, that provides newer essential characteristics when compared with devices used at the moment for the same purpose.

The device that is hereinafter described has been conceived to carry out an oscillating movement comprised within margins previously established, and with the purpose of transmitting this movement to systems or other devices that require the fulfilment of short length displacement. A typical application of a device with the characteristics of the one to be described could be, for instance, to act automatically on an aerosol container nozzle. As is known, such a nozzle is subject to the application of pressure to liberate a quantity of the contents of the aerosal container and afterward to a return movement in the opposite direction. The existing devices for such use generally have springs that have to be tightened by means of small electric motors, so that when subsequently freed they will allow the nozzle of the aerosol container to be operated. As it is logical to think, the different parts are submitted to considerable effort that shortens their useful life span and, besides, the power consumption of the devices, usually supplied through batteries, becomes very high.

The device in accordance with the invention has numerous advantages when compared with those already known, because it provides for a mechanism that functions smoothly, is prefectly guided with highly reduced friction, and is capable of delivering the maximum power to the equipment to which it is applied.

SUMMARY OF THE INVENTION

The device of the present invention essentially includes a flat transverse part that carries out the reciprocating motion, whose lateral terminal edges are contained in guiding slots that are arranged in lateral jambs. The oscillating movement is provided by the flat lateral part when it is moved along the slots by two gearwheels that receive the movement from a shaft operated by an electric motor.

On the other hand, the already mentioned transverse part has a spring in the lower edge, arranged to be used as an elastic means for the transference of the reciprocating motion to the associated equipment.

The mechanism also includes a gear, moved by one of the gearwheels, and the gear has one or more tracks on one face, the tracks positioned concentric with the axis of rotation of the gear and interrupted in one or more sections. Electrical switches rest on the respective tracks. Likewise, one of the gearwheels has, on one of its faces, a track, interrupted in a predetermined section, and on which another electrical switch rests. The unit is completed by means of a conventional type electrical timer that turns the unit on or off in predetermined time intervals.

BRIEF DESCRIPTION OF THE DRAWINGS

The detailed description that follows will refer to the accompanying drawings, in which as an example, and thus without restrictive character, is illustrated one preferred form of performance. In the mentioned drawings.

DESCRIPTION OF THE PREFERRED EMBODIMENTS

Figure 1:
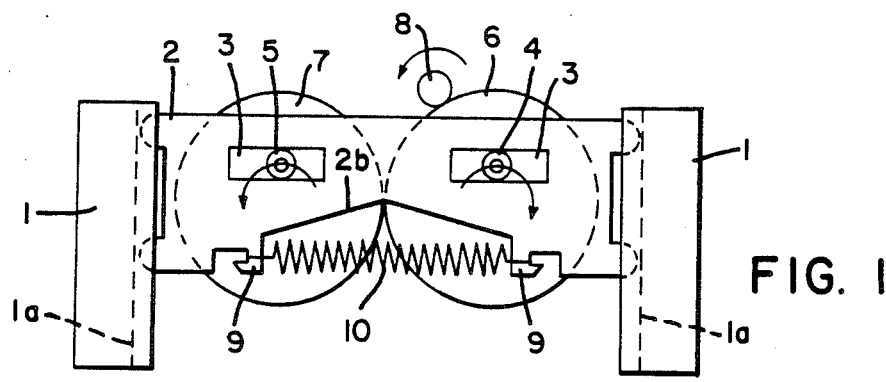
FIG. 1 shows a front elevational of a mechanism in accordance with the present invention.

Referring initially to FIG. 1 of the drawing, shown therein is a front elevation of the mechanism that constitutes a reciprocating motion device in accordance with the present invention. In that figure it can be seen that this mechanism includes two laterally spaced jambs or struts 1 in a vertical position opposite and parallel to each other. In the opposed inside surfaces there are longitudinal slots 1a that act as guides for the vertical reciprocating motion carried out by the flat transverse part 2. This transverse part has two openings 3 horizontally located and aligned one with the other, into which the studs 4 and 5 fastened to respective gear wheels 6 and 7 extend. At least one of these gear wheels 6, 7 is turned by a shaft 8 that, at the same time, is moved by an appropriate motor and by means of a reducer gear, in a manner that will be hereinafter described.

The flat transverse part 2 includes a downwardly facing, elongated, U-shaped opening 2b that has lateral ends defined by two small hook-like projections 9 headed in opposite directions, to which the ends of a transversely extending tension spring 10 are hooked.

Figure 2:
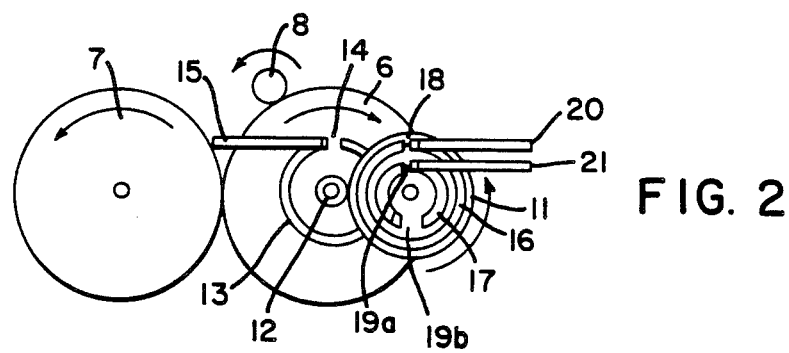
FIG. 2 is a rear elevation of the mechanism of FIG. 1.

FIG. 2 shows a rear elevation of the mechanism of FIG. 1, in which there are only represented the gearwheels 6, 7, the motion shaft 8, and a gear 11 rotatably carried by one of the gear wheels 6 or 7 (in this case it is attached to wheel 6). The gear 11 is driven from gearwheel 6 by means of a toothed shaft 12, for which there will be a preconceived relation, in terms of the number of teeth on the shaft 12 and on the gear 11, between the speed of wheel 6 and of gear 11. Preferably, this speed relation should be 4 to 1.

The gearwheel 6 has on the rear surface an outwardly extending track 13, that includes a gap or opening 14. Against an outer edge of said track 13 rests an electrical switch 15 that preferably should be made up of two metallic conductor sheets 15a and 15b facing each other and parallel one to the other, of which the inner sheet 15a should be in permanent contact with the track 13 until the end of that sheet, as a function of the position of track 13, reaches the interrupted position or opening 14.

Gear 11 has two outwardly extending concentric tracks 16, 17, of which the radially outermost track 16 includes a single gap or opening 18, while the radially innermost track 17 is interrupted by two openings 19a and 19b that are diametrically opposed. On each of tracks 16 and 17 rest two electrical switches 20, 21, respectively each one of which, as in the case of switch 15, is fashioned by two conductor sheets (21a and 21b in the case of switch 21), opposite and parallel one to the other, and whose internal surfaces permanently lay on the respective tracks except in the open areas of the tracks.

Figure 3:
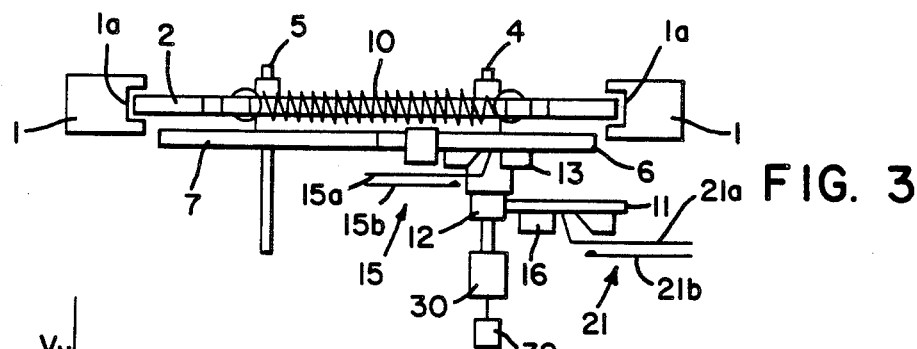
FIG. 3 is a bottom view of the mechanism of FIG. 1.

FIG. 3 shows a bottom view of the mechanism described, based on the preceding figures, where the relative positions of each one of the parts already described are shown, and also the constitution and relative position of the metallic sheets that define the different switches 15, 20 and 21 that have already been described.

The device hereinabove described in reference to FIGS. 1 and 3, provides the preferred performance of the invention. Also included is an electronic timer 32 which is of conventional type. However, it should be made clear that the timer supplies contact impulses to electric motor 30 by means of which the movement of gearwheels 6, 7 is initiated through the rotation of shaft 8, and provides movement that is self-maintained until the corresponding switches determine when the equipment should be stopped, all of which will be explained in what follows.

As a matter of fact, switches 15, 20, 21 are open when the respective innermost sheets have their ends resting in the gaps or open areas of the respective tracks 13, 16, 17 of gearwheel 6 and of gear 11. In these conditions, the motor does not receive electric power and therefore the equipment is at a stop. The mentioned switches are connected in series.

The electronic timer sends a contact impulse to the motor and starts it, so that gearwheels 6, 7 are moved through shaft 8, so that the innermost sheets of the switches 15, 20, 21 ride up on their respective tracks 13, 16, 17, maintaining the mentioned switches in the closed position, and thus maintaining the supply of current to the electric motor, wherefore the movement continues in a self-maintained way until one of the switches reaches the open region of its respective track and cuts off the electrical supply to the motor.

The movement of gearwheels 6 and 7 makes the studs 4 and 5, fastened to them, describe a circle of radius equivalent to the distance existing between the mentioned studs and the axis of rotation of the wheels, the studs moving horizontally along the horizontal openings 3 of the flat transverse part 2, and carrying part 2 into a vertical oscillating movement, for displacement guided by the slots 1a formed in the facing internal edges of each of the jambs 1.

The cycle of action is defined by a full turn of wheels 6 and 7. That is to say, taking as the starting point of the cycle the position shown in FIG. 1, the full turn will be completed when the studs 4 and 5 have described a complete circle (which corresponds to a full turn of the wheels) and again reach the initial position. With this, the flat transverse part 2 will have performed a downward advancing movement (push) and another upward movement back to its initial position. The equipment which has to receive the movement corresponding to the advancing movement of transverse part 2 will be resting on the spring 10, so that any allowance in the push motion will be absorbed by the stretching of the spring.

A new and important characteristic of this device is the fact that the possibility of performing several cycles as the one described when the mechanism is started has been anticipated. That is to say, that once the period of timing has elapsed and independently of its duration, the electrical supply to the motor will be self-maintained until wheels 6, 7 have turned several times and several push and return motions of the flat transverse part 2 have been produced. This can be achieved by electrically bridging one or more switches 15, 20, 21.

As has been described before, the different switches are connected in series, so that the equipment continues to move until one of the switches reaches the open position. On the other hand, to obtain a certain number of cycles it is necessary to bear in mind the existing relation between the speeds of wheels 6, 7 and the gear 11, so that if this relation is, as was said before, 4 to 1, that means, that if wheels 6 and 7 turn four times while the gear 11 turns once, the flat transverse part performs four downward-upward movements every time the equipment is started.

If the position shown in FIG. 2 is considered, it can be seen that when the wheels 6, 7 complete a turn, the gear 11 will have rotated ¼ of a turn. The switch 15 again reaches the open or interrupted area of track 13 and opens the circuit that feeds the motor, stopping the movement. Switches 20 and 21 will be closed but the feeding of power to the motor will be cut off by switch 15. With the next complete rotation of wheels 6, 7, the gear 11 will have completed half a turn, so at that moment switch 20 will be closed and switches 15 and 21 will be open, cutting off the supply of current to the motor. The set of wheels 6, 7 and gear 11, and the switches 15, 20 and 21, will be exactly in the same starting position when the electronic timer has produced, after the corresponding periods of timing, the starting of the equipment four times.

If switch 15 is electrically bridged, the stopping of the equipment will be controlled by switches 20 and 21. In this case it is necessary that the wheels 6, 7 completely turn twice before the switch 21 reaches the open area of track 17, opposite to the starting position, and cut the electrical supply to the motor. With this, two downward-upward movements of the flat transverse part 2 are obtained every time that the timer starts the equipment.

If switches 15 and 21 are bridged, the stopping of the equipment would be controlled only by switch 20, so now it will be necessary that the gear 11 completes a full turn before the switch 20 again reaches the open area of the track 16, and consequently to cut off the electrical supply to the motor. In this case, wheels 6, 7 will completely turn four times and the flat transverse part 2 will have made four downward-upward movements.

It is to be understood that the obtaining of any other number of relative movements of transverse part 2 will depend only on an adequate selection of the speed relation between wheel 6 and gear 11. On the other hand, it can be seen that with the described elements it is possible to obtain a great number of different movements without modifying the electronic circuit.

The efficiency of the equipment is higher than that of any of the devices actually in use, thanks to the reduction of the friction coefficients and to the lack of elements that could cause a heavy load on the mechanism.

Figure 4:
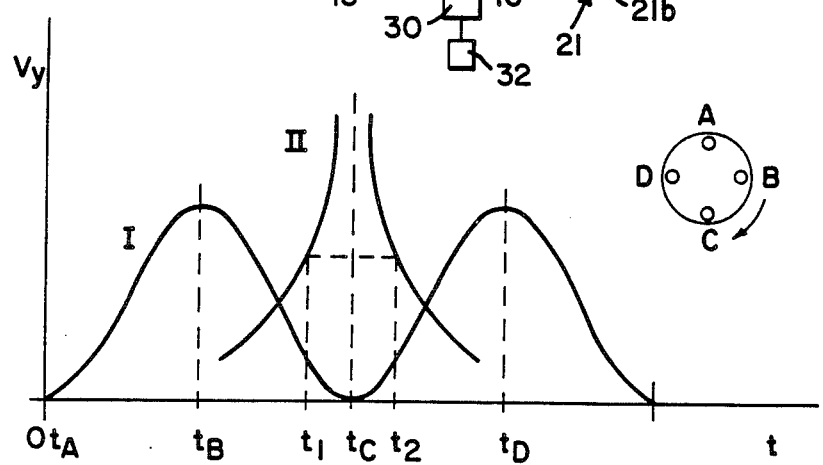
FIG. 4 is a graphical description of the change of the parameters speed and force applied, as a function of time.

The performance of the device on an equipment or on another associated loading device will be performed during the second one fourth of a turn of wheel 6. The capacity of the mechanism to produce power is clearly deduced from the graphic representation that appears in FIG. 4, whose ordinate axis represents the vertical component of the turning velocity and whose abscissa axis represents time. The curve I of variation of the vertical componentry $V_y$ of the velocity of stud 4, as an example, as a function of time (and therefore of the upward-downward speed of the flat transverse part 2), is clearly sinusoidal. Times $t_A$, $t_B$, $t_C$, $t_D$, marked on the abscissa axis correspond to the instants in which the stud 4 reaches, respectively and successively, positions A, B, C and D pointed out in the wheel represented on the right hand side of the figure. Time $t_1$ and $t_2$ respectively mark the moment in which the spring 10 in its downward movement begins to push on the load to be handled, and the moment in which the spring during its upward movement loses contact with such load. Evidently, the pushing time is the one comprised between instants $t_1$ and $t_C$.

Curve II shows, however, the variation of the downward pushing capacity of flat transverse part 2 (and of the spring 10), as a function of the position occupied by wheels 6, 7. At the instant $t_C$ this capacity is extremely high.

The physical formulae that follow clearly show the previously made considerations. In the formulae are considered only the vertical components of the push force and of the velocity.

$$T = F*y,$$

$$P = W/t = Fy*y/t = Fy*Vy \rightarrow F = P/v$$

When $v = 0 \rightarrow F = \infty$

I claim:

1. A device for providing reciprocating motion to obtain short length displacements, the device comprising: two gearwheels drivingly connected one to the other and having respective axes of rotation, drive means for rotating one of the gearwheels which acts as a driving wheel of the other gearwheel, each gearwheel having a frontal stud extending axially in displaced position in regard to its axis of rotation, a transverse member that can move vertically, the transverse member having opposite ends and including a pair of spaced slots to receive respective ones of the studs, vertical guide means arranged to receive respective opposite ends of the transverse member for reciprocating movement of the transverse member in the guide means, wherein one of the gearwheels includes an axially outwardly extending circular track that includes at least one opening, and wherein the track is concentric with the axis of rotation of the one gearwheel, and electrical contact means in contact with the track for controlling the operation of an electrical circuit by actuating the contact means when the contact means is opposite the opening of the track, and wherein one of the gearwheels drives a rotatable gear which has two outwardly extending concentric circular tracks, one of which tracks includes a gap at one point and the other track includes two diametrically opposed gaps, and electrical contact means in contact with each of the tracks for controlling the feeding of an electrical supply to the drive means.

2. A device as defined in claim 1, wherein the transverse member includes along a lower edge a wide central cut, hooking means on each end of the central cut, and spring means for attachment to the hooking means, the spring means extending between the hooking means.

3. A device as defined in claim 1 including electronic timer means for starting the drive means at predetermined time intervals.

4. A device as defined in claim 1, wherein the respective electrical contact means are connected in series.

* * * * *